Aug. 30, 1927.
P. E. FENTON
DOUBLE POINTED PIN FASTENER
Filed May 4, 1927
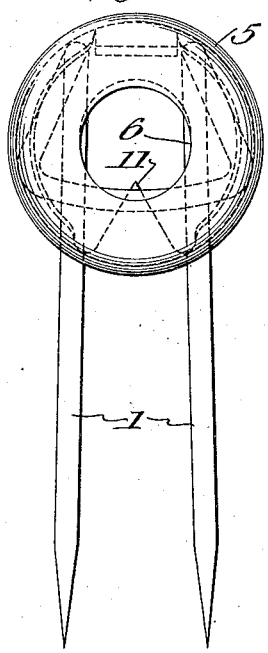
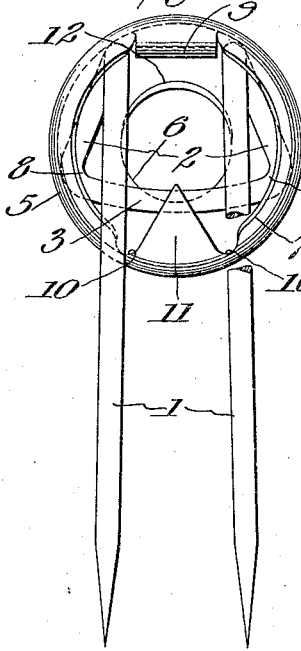
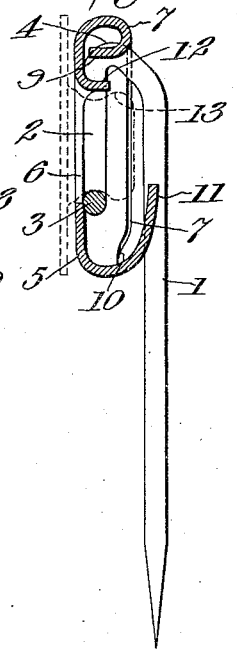
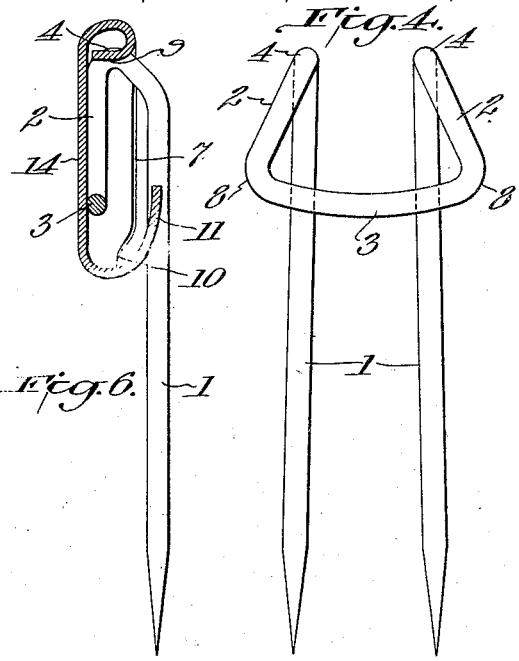
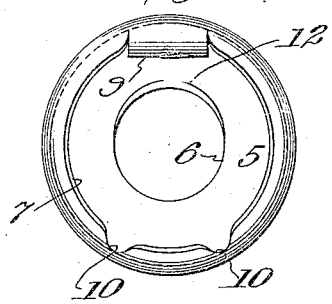
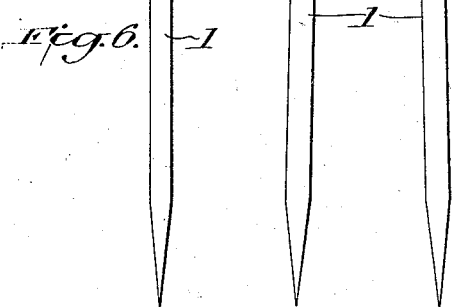
Inventor
Paul E. Fenton
by
Wm H Finckel
Attorney Patented Aug. 30, 1927.

1,641,075

UNITED STATES PATENT OFFICE.

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT.

DOUBLE-POINTED-PIN FASTENER.

Application filed May 4, 1927. Serial No. 188,756.

One object of this invention is to adapt the principle of the double-pointed pin fastener of the Boden, King and Chapman Patent, No. 1,604,801, granted October 26, 1926, for use with a snap fastener element. To this end the invention consists in replacing the cap of that patent by a perforated cap, which in connection with a modified looped head of the pin embodies a socket member for cooperation with a complemental stud member.

When used for securing covers to upholstered bodies, the stud members will be attached to the cover and the socket members will be stuck in the upholstered portions of the body and thus may be applied to register correctly with the fixed stud members, so that the stud members may be engaged with the socket members by entering the holes in the socket members and then snapped into spring engagement with the limbs of the looped head.

Another object of the invention is to utilize the modified form of double-pointed pin in a non-snap fastener, and to this end the invention consists of a double-pointed pin having the aforementioned modified head and a nonperforated cap.

In the accompanying drawings illustrating the invention, in the several figures of which like parts are similarly designated, Figure 1 is a front elevation, Fig. 2 a rear elevation, with one limb of the pin member broken out, and Fig. 3 is a longitudinal section illustrating one embodiment of the invention; Fig. 3 also showing one form of stud conventionally. Fig. 4 is a front elevation of the pin detached. Fig. 5 is a rear elevation of a modified form of cap detached. Fig. 6 is a longitudinal section illustrating the invention as applied to a closed or nonsocket cap.

The double-pointed pin herein shown has a pair of pointed substantially parallel limbs 1, with the bent-over integral head portion. This head portion comprises the diverging side members 2, the bend 3, and the humped tops 4 where the head is bent over from the tops of the limbs 1. The members 2 project laterally beyond the limbs 1, and the bend 3 crosses the limbs transversely and forms the spring element of a snap fastener socket member which is adapted to engage a complemental head or stud of such fastener.

It will be observed that the bent-over or humped head is substantially triangular in outline, the sides 2 forming the sides of the triangle and the bend 3 the base of the triangle.

5 is a cap member having the central opening 6 for cooperation with the stud member. This cap also has the peripheral flange 7 adapted to engage the pin head by embracing its portions 4 and its corners 8 which connect the portions 2 and 3, so that the pin has a four-point connection with the cap.

As will appear by reference to Figs. 1, 2 and 3, the portion 3 crosses the opening 6 in the cap so as to come into contact with the stud.

In order to ensure the spacing apart of the members of the pin head, the flange of the cap may have an inturned portion 9, which, while limiting the approach of the portions 4 of the pin head, yet permit the necessary play of these portions laterally. This portion 9 also prevents the rotation of the cap on the pin. The limbs of the pin may enter notches 10 in the flange of the cap to prevent undue movement of said limbs in sticking the pin into an article. The cap also may be provided with an inverted V-shaped prong 11 rising from the bottom of the flange of the cap and between the notches 10, although as indicated in Fig. 5, a cap without such a prong may be used.

The prong is fixed and adapted to engage automatically the fabric on which the fastener is used to prevent the accidental escape of the fastener. To disengage the prong from the fabric, a thin tool, such as a knife blade, may be inserted between the fabric and the bottom of the cap, to thereby force the limbs of the pin away from the prong and also force the fabric over the point of the prong.

The front of the cap is shown, particularly in Fig. 3, as flat and in the preferred construction, this front will be flat or as nearly flat as possible so as to afford the least possible projection of parts in use and thereby avoid annoyance to the users.

The upper portion of the hole in the cap is made with the inturned tongue 12 which is designed to bear against the stud head as it engages with the socket spring, to keep the axis of the stud or head substantially normal to the plane of the front of the cap.

Without such a tongue this normalcy would not be maintained and the snap action would be poor; and moreover, the thin edge of the hole might, in effect, hook into the groove or knurl on the stud and interfere with a smooth releasing action.

The head of the pin affords ample resilience in the socket member. When the stud 13 is pressed on the wire midsection or bend 3 the pin will spring yieldingly at the point of contact and also at the two humps about where the long straight pin members begin. These humps would approach each other and would return to normal position after the tension caused by the stud was released.

A pin having the head construction shown in detail in Figs. 3 and 4, might be used with a closed cap 14, as indicated in Fig. 6, and with or without the prong 11, the advantages of the peculiar formation of the head of the pin so far as concerns the four-point bearing of the cap and pin head being retained. In other words, the cap of the non-socket pin may be of any of the constructions herein disclosed, excepting that it is not utilized as a socket member and the tongue 12 is not used.

Other variations of the invention are permissible within the principle of the invention and the scope of the claims following.

What I claim is:—

1. A double-pointed pin fastener of snap-fastener type, having a cap provided with a flanged rim and a substantially central opening, and a double-pointed pin having a substantially triangular bent-over and humped head engaged at four points by the flanged cap, the base of the head crossing the lower portion of the opening in the cap and adapted to engage the head of a stud which forms the complemental member of the snap-fastener.

2. A double-pointed pin fastener of snap-fastener type, having a cap provided with a flanged rim and a substantially central opening and an inturned tongue at the top thereof, and a double-pointed pin having a substantially triangular bent-over and humped head engaged at four points by the flanged cap, the base of the head crossing the lower portion of the opening in the cap and adapted to engage the head of a stud which forms the complemental member of the snap-fastener, said tongue serving to keep the axis of the stud head substantially normal to the plane of the front of the cap.

3. A double-pointed pin fastener, having a cap provided with a flanged rim, and a double-pointed pin having its head formed as a bent-over and humped loop, the sides of the loop diverging laterally from the upper portion of the loop and the lower portions of these sides connected by a substantially straight portion extending transversely from side to side of the cap, said loop having a four-point engagement with the flanged cap.

In testimony whereof I have hereunto set my hand this 3rd day of May, A. D. 1927.

PAUL E. FENTON.